(12) United States Patent
Gartenberg et al.

(10) Patent No.: US 10,933,977 B2
(45) Date of Patent: Mar. 2, 2021

(54) SYSTEMS AND METHODS FOR NOISE MITIGATION FOR HYBRID AND ELECTRIC AIRCRAFT

(71) Applicant: Embry-Riddle Aeronautical University, Inc., Daytona Beach, FL (US)

(72) Inventors: Lenny Gartenberg, Coral Springs, FL (US); Richard P. Anderson, DeLeon Springs, FL (US); Borja Martos, Port Orange, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 294 days.

(21) Appl. No.: 15/975,220

(22) Filed: May 9, 2018

(65) Prior Publication Data
US 2018/0327081 A1    Nov. 15, 2018

Related U.S. Application Data

(60) Provisional application No. 62/504,169, filed on May 10, 2017.

(51) Int. Cl.
*B64C 11/30* (2006.01)
*B64C 11/06* (2006.01)
*B64D 27/02* (2006.01)

(52) U.S. Cl.
CPC ............ *B64C 11/305* (2013.01); *B64C 11/06* (2013.01); *B64C 11/301* (2013.01); *B64C 2220/00* (2013.01); *B64D 2027/026* (2013.01)

(58) Field of Classification Search
CPC ... B64C 11/06; B64C 11/305; B64C 2220/00; B64C 2230/14
See application file for complete search history.

(56) References Cited

U.S. PATENT DOCUMENTS

| | | | |
|---|---|---|---|
| 3,747,343 | A | 7/1973 | Rosen |
| 4,019,702 | A | 4/1977 | Annin |

(Continued)

FOREIGN PATENT DOCUMENTS

| | | |
|---|---|---|
| DE | 10 2010 021022 A1 | 11/2011 |
| DE | 10 2013 209538 A1 | 11/2014 |

(Continued)

OTHER PUBLICATIONS

International Search Report and Written Opinion for related Application No. PCT/US2018/031761, dated Aug. 30, 2018.

(Continued)

*Primary Examiner* — Jessica B Wong
(74) *Attorney, Agent, or Firm* — Womble Bond Dickinson (US) LLP

(57) ABSTRACT

A system and method of noise mitigation for hybrid and electric aircraft, the aircraft having a controllable pitch propeller or rotor(s) with a plurality of blades. The propeller or rotor(s) are driven by a drive system to provide thrust for the aircraft, and the blades of the propeller or rotor(s) are further movable about pivot axis to vary a pitch thereof. A controller on-board the aircraft is operable to cause rotation or movement of the blades of the propeller or rotor(s) about their pivot axis to alter and/or focus at least one aspect of the propeller generated noise to reduce or mitigate such noise while maintaining a substantially constant thrust, altitude, and/or air speed of the aircraft.

15 Claims, 11 Drawing Sheets

(56) References Cited

U.S. PATENT DOCUMENTS

| | | | |
|---|---|---|---|
| 5,284,418 | A | 2/1994 | Moriya |
| 5,735,670 | A * | 4/1998 | Moffitt ................. B64C 11/003 244/1 N |
| 5,997,250 | A | 12/1999 | Carter, Jr. et al. |
| 6,231,005 | B1 * | 5/2001 | Costes ................. B64C 27/605 244/17.25 |
| 8,868,257 | B2 | 10/2014 | Kirchhofer et al. |
| 9,102,326 | B2 | 8/2015 | Anderson et al. |
| 9,254,992 | B2 | 2/2016 | Ju |
| 2006/0111818 | A1 | 5/2006 | Ishii et al. |
| 2008/0184906 | A1 * | 8/2008 | Kejha ................... B64D 27/02 102/374 |
| 2011/0027082 | A1 * | 2/2011 | Herpin ................. B64C 27/001 416/1 |
| 2013/0147204 | A1 | 6/2013 | Botti et al. |
| 2013/0264412 | A1 | 10/2013 | Dyrla |
| 2014/0064968 | A1 | 3/2014 | Negulescu et al. |
| 2014/0308124 | A1 | 10/2014 | Moore et al. |
| 2015/0014475 | A1 * | 1/2015 | Taylor ..................... B64C 11/32 244/6 |
| 2016/0355272 | A1 | 12/2016 | Moxon |
| 2017/0021924 | A1 * | 1/2017 | Kubik ..................... B64C 27/48 |

FOREIGN PATENT DOCUMENTS

| | | |
|---|---|---|
| JP | 06-206594 A | 7/1994 |
| KR | 10-2013-0073410 A | 7/2013 |
| WO | WO2016/053408 A1 | 4/2016 |

OTHER PUBLICATIONS

SAE: Aerospace Information Report 1407—*Prediction Procedure for Near-Field and Far-Field Propeller Noise*; Society of Automotive Engineers Inc.; May 1977.

Computing Distances: retrieved from http://www.cs.nyu.edu/visual/home/proj/tiger/gisfaq.html; available May 2007.

Find Unit Vector Given Roll, Pitch, and Yaw; retrieved from http://math.stackexchange.com/questions/1637464/find-unit-vector-given-roll-pitch-and-yaw; available Jan. 2017.

Wolframalpha; Earth Radius retrieved from http://m.wolframalpha.com/input/?i=earth+radius; available Jan. 2017.

Notification Concerning Transmittal of International Preliminary Report on Patentability and the International Preliminary Report on Patentability dated Nov. 21, 2019.

Extended European Search Report for related application, EP 18798130.3, dated Dec. 29, 2020.

\* cited by examiner

SYSTEMS AND METHODS FOR NOISE MITIGATION FOR HYBRID AND ELECTRIC AIRCRAFT

CROSS REFERENCE TO RELATED APPLICATIONS

The present application claims the benefit of previously filed, U.S. Provisional Patent Application No. 62/504,169, filed May 10, 2017.

INCORPORATION BY REFERENCE

The specification and drawings of U.S. Provisional Patent Application No. 62/504,169, filed May 10, 2017, are specifically incorporated herein by reference as if set forth in their entirety.

TECHNICAL FIELD

The present disclosure is directed to hybrid and electric aircraft and, in particular, to systems and methods for mitigation of noise from the operation of such aircraft.

BACKGROUND

Hybrid and electric aircraft propulsion technologies have the capability of reducing carbon emissions, fossil fuel usage, operating cost, and the noise footprint of modern aircraft. Aircraft noise is not a trivial problem, however, and is expected to be a major design issue for hybrid and electric aircraft. For example, when balanced against propulsion and/or power requirements, such as the need to maintain constant thrust for flight and noise created by an aircraft's propeller as a function of RPM, blade pitch, air speed, and other factors. Accordingly, the present disclosure addresses the foregoing and other related and unrelated issues in the art.

SUMMARY

Briefly described, in one aspect, the present disclosure is directed to systems and methods for mitigating noise generated by hybrid and electric aircraft.

On one example aspect, an aircraft, such as a hybrid aircraft, will include an aircraft drive or propulsion system that includes an electric motor, and further also can include an internal combustion engine. Alternatively, the aircraft can include an electric motor driven or powered aircraft where the drive system includes an electric motor, without necessarily requiring or having a gas powered or other internal combustion engine, and without departing from the scope of the present disclosure.

The aircraft further will include one or more rotatable airfoils or blades that are movable or otherwise reconfigurable to alter or control a pitch or angle thereof. In one embodiment, the aircraft can include and be driven by a controllable pitch propeller, which controllable pitch propeller generally will have a plurality of airfoils or blades that are rotatable, pivotable, or otherwise moveable between a plurality of positions to alter the noise footprint of the hybrid and/or electric aircraft on the ground with respect to a driveshaft of the drive system, as needed, while also maintaining a substantially constant thrust and altitude in flight during operation of the electric motor. The aircraft additionally, or in the alternative, can include and be driven by one or more rotors or prop-rotors that have a controllable pitch or that are otherwise moveable/reconfigurable to change an angle or orientation thereof to allow for the control of noise emitted thereby, without departing from the scope of the present disclosure.

The aircraft further can include a controller or other suitable mechanism operable to adjust the blades of the propeller between the different positions during flight to vary the propeller blade pitch or angle or rotor/prop-rotor blade pitch or angle. The controller can automatically adjust the blades and/or the controller can facilitate manual adjustment of the blades by a pilot or other operator of the aircraft. Such variation of the blades may be controlled independently from the operation of the engine, to alter or focus a peak noise direction of the noise generated by the blade rotation, while also maintaining substantially constant thrust and a substantially constant airspeed.

In one aspect, the controller can include programming operable to determine and/or map a distance and azimuth angle between the propeller and an observer, using a series of noise map inputs, including features/configuration information of the propeller or rotor, power, and other factors based on the flight path of the aircraft, such as a determined attitude, azimuth angle, and/or position of the aircraft, to create or generate a noise pattern or map. Noise sensitive areas of the map further can be marked by an index of the relative sensitivity/noise levels versus power settings or speeds of the aircraft.

The controller can automatically alter the pitch or angle of the blades based at least in part on the generated noise pattern/map, determined noise sensitive areas, and/or other suitable information. In addition, or in the alternative, the controller can be configured to display the noise map on one or more displays of the aircraft, such as on a monitor, heads-up display, instrument, or other gauge on the aircraft's control panel, or through any other suitable display in the cockpit or cabin of the aircraft. This displayed noise map can be used by the pilot, e.g., in an off nominal situation, as a guide for changing blade pitch to reduce or angle aircraft noise over the highly sensitive areas, without altering the flight path or air speed of the aircraft.

Additionally, a method for mitigating noise footprints of hybrid and/or electric aircraft can include the use of a propulsion system with an electric motor and a controllable pitch propeller. This method can include changing the propeller blade angle independently from the operation of the engine, therefore altering the peak noise direction while maintaining substantially constant thrust and airspeed of the aircraft.

The method can include determining and/or mapping a distance and azimuth angle between the propeller and an observer based upon an altitude, attitude, and/or position of the aircraft, and applying these results with additional factors or parameters to generate a noise map for the aircraft with noise sensitive areas marked by an index of the relative sensitivity of this specific area.

The noise map can be used by the aircraft pilot to control variation of the pitch of the aircraft propeller to enable reduction of noise over the highly sensitive areas, without substantially altering the flight path or airspeed of the aircraft.

With the systems and methods according to principles of the present disclosure, pilots may be allowed to fly over populated or noise sensitive areas, such as national parks, cities, etc., and reduce the noise footprint of the aircraft as they approach such areas without altering their flight plan or course at the cost of propulsive efficiency. Additionally, a noise sensitivity map can be developed and displayed to provide a visual guide or indication of areas where a pilot would need to adjust flight settings to best comply with noise restrictions, which noise sensitivity map further can be presented to the pilot on the displays of the aircraft.

Various objects, features, and advantages of the present invention will become apparent to those skilled in the art upon a review of the following detailed description, when taken in conjunction with the accompanying drawings.

BRIEF DESCRIPTION OF THE FIGURES

The accompanying drawings, which are included to provide a further understanding of the embodiments of the present disclosure, are incorporated in and constitute a part of this specification, illustrate embodiments of the present disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced. According to common practice, the various features of the drawings discussed below are not necessarily drawn to scale. Dimensions of various features and elements in the drawings may be expanded or reduced to more clearly illustrate the embodiments of the disclosure.

DETAILED DESCRIPTION

Figure 1:
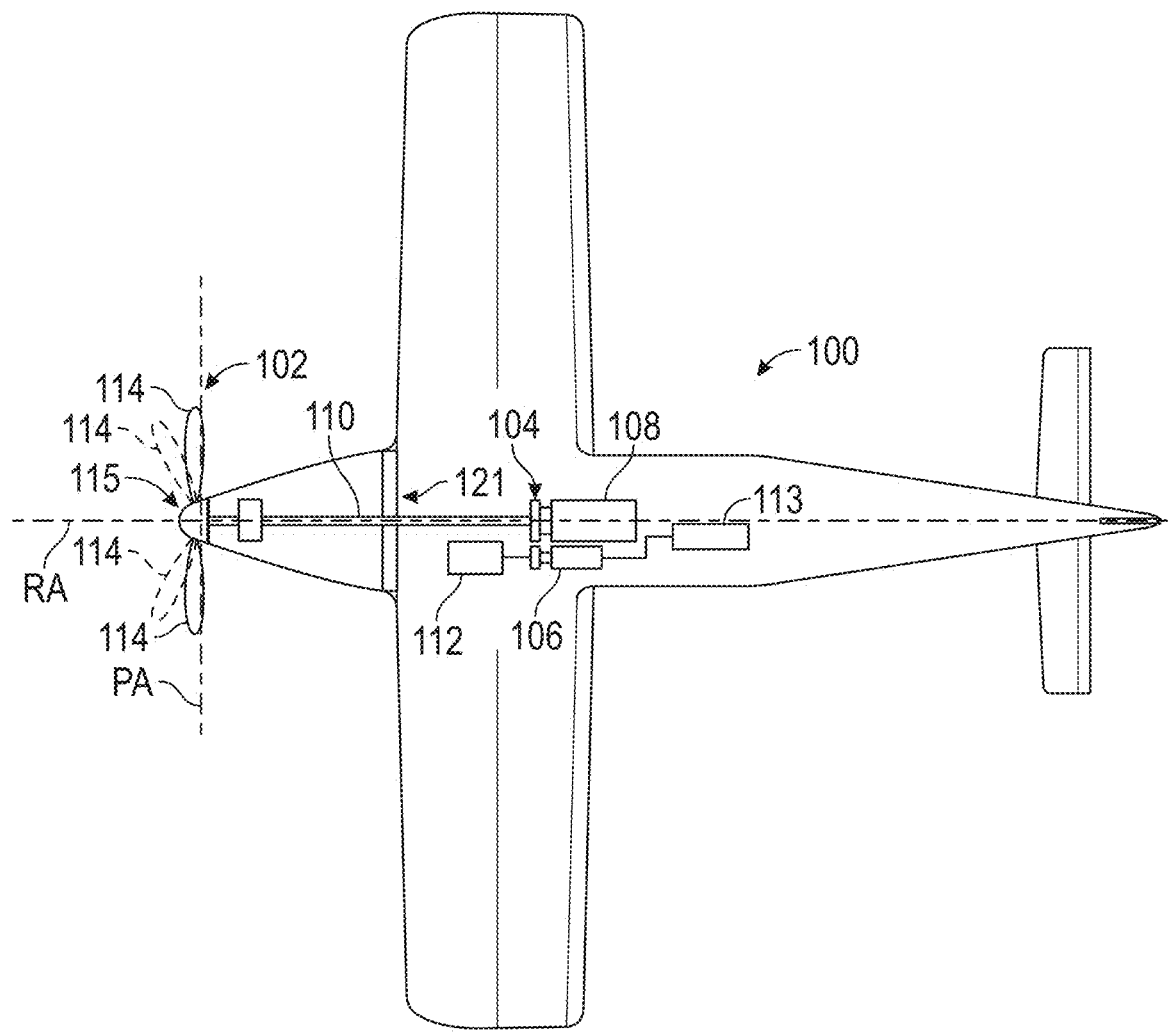
FIG. 1 schematically illustrates an example aircraft according to principles of the present disclosure.

FIG. 1 shows an aircraft 100 configured and/or operable to provide noise mitigation in accordance with the principles of the present disclosure. It will be understood that the following description is provided as an enabling teaching of embodiments of this disclosure. Those skilled in the relevant art will recognize that many changes can be made to the embodiments described, while still obtaining the beneficial or desired results. It also will be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the embodiments of a system and method for providing noise mitigation for aircraft and not in limitation thereof.

As shown in FIG. 1, the aircraft 100 includes a forward mounted propeller 102 that is driven by a drive or propulsion system 104. The drive system 104 may include a hybrid propulsion system having one or more electric motors 106, and also can include an internal combustion engine 108, each of the motors being able to be coupled or linked in communication with the propeller 102, such as by a propeller drive shaft 110 that is operatively connected to the aircraft propeller 102, to enable power transfer between the electric motor 106 and/or the internal combustion engine 108 and the propeller 102. The electric motor 106 and/or the internal combustion engine 108 can be connected to the propeller drive shaft 110 or the propeller 102, through one or more gear or pulley assemblies and/or using other suitable drive coupling mechanisms or connecting devices without departing from the scope of the present disclosure.

The aircraft 100 additionally or in the alternative can include and be driven by one or more rotors or prop-rotors that have a plurality of blades or airfoils with a controllable pitch or that are otherwise moveable/reconfigurable to change an angle or orientation thereof, without departing from the scope of the present disclosure.

In one example, the hybrid propulsion system 104 further can include one or more mechanisms, such as a clutch or other suitable mechanism or device, that allows for selectively engaging and disengaging the electric motor 106 or the internal combustion engine 108 to the propeller 102, such that for example, the aircraft 100 can operate in a hybrid mode, wherein the propeller 102 is driven by the electric motor 106 and the internal combustion engine 108, an electric mode, wherein the propeller 102 is driven solely by the electric motor with the internal combustion engine decoupled from the propeller; and/or an engine only mode, wherein the propeller 102 is driven only by the engine 108 with the motor 106 decoupled from the propeller. Exemplary assemblies for hybrid aircraft are shown and described in U.S. Pat. Nos. 9,102,326 and 9,254,992, which are incorporated by reference herein as if set forth in their entireties.

In another example, the electric motor 106 and the internal combustion engine 108 can be arranged in a serial configuration, with the internal combustion engine 108 operatively coupled to the electric motor 106 or a power source 113 (i.e., battery or batteries) thereof and with the internal combustion engine 108 principally serving only to generate electricity to power the electric motor 106 and/or recharge the power source 113 supplying power to the electric motor 106.

In yet another example, the aircraft 100 can comprise an electric powered aircraft that can omit the internal combustion engine 108, and with the aircraft propeller 102 being powered by one or more electric motors 106. Such electric motor(s) can be connected to the propeller 102 by one or more gear or pulley assemblies, or other suitable devices/mechanisms.

With embodiments of the present disclosure, an example gear or pulley ratio between the propeller and the electric motor can be 1:1, though any suitable ratio is possible, e.g., 1.5:1, 2:1, 3:1, 1:3, 1:2, 1:1.5 etc., without departing from the present disclosure. The electric motor also can be directly connected to the propeller 102, for example, with the propeller attached to a driveshaft of the electric motor, without departing from the present disclosure.

The electric motor 106 generally uses electricity as its main power source. For example, the electric motor 106 can be in communication with one or more power sources 113, such as one or more batteries, and/or other suitable power generating devices. The internal combustion engine 108 further can be connected to a generator so as to enable recharging of the power source 113, during flight. The use of electric motors expands the capabilities and can offer benefits that gas engines cannot, as electric motors are inherently quieter, highly efficient, produce no carbon emissions, and can have fewer moving parts, thus reducing operating costs and maintenance. By way of illustration and example, the electric motor 106 can include a YASA 750 by YASA Ltd. of Kidlington, UK, and it will be understood that other suitable electric motors capable of delivering several hundred horsepower, with a high specific torque power, such as electric motors suitable for light weight aircraft operations also can be used, without departing from the present disclosure. Further examples of electric motors can include an AF—130, AF—140, AF—230, or AF—240 electric motor by GKN, plc of Worcestershire, UK; an HVH410-075 or HVH410-150 electric motor by Remy International, Inc. of Pendleton, Ind.; and/or a PowerPhase HD 220 or PowerPhase HD 250 electric motor by UQM Technologies of Longmont, Colo.

Figure 2:
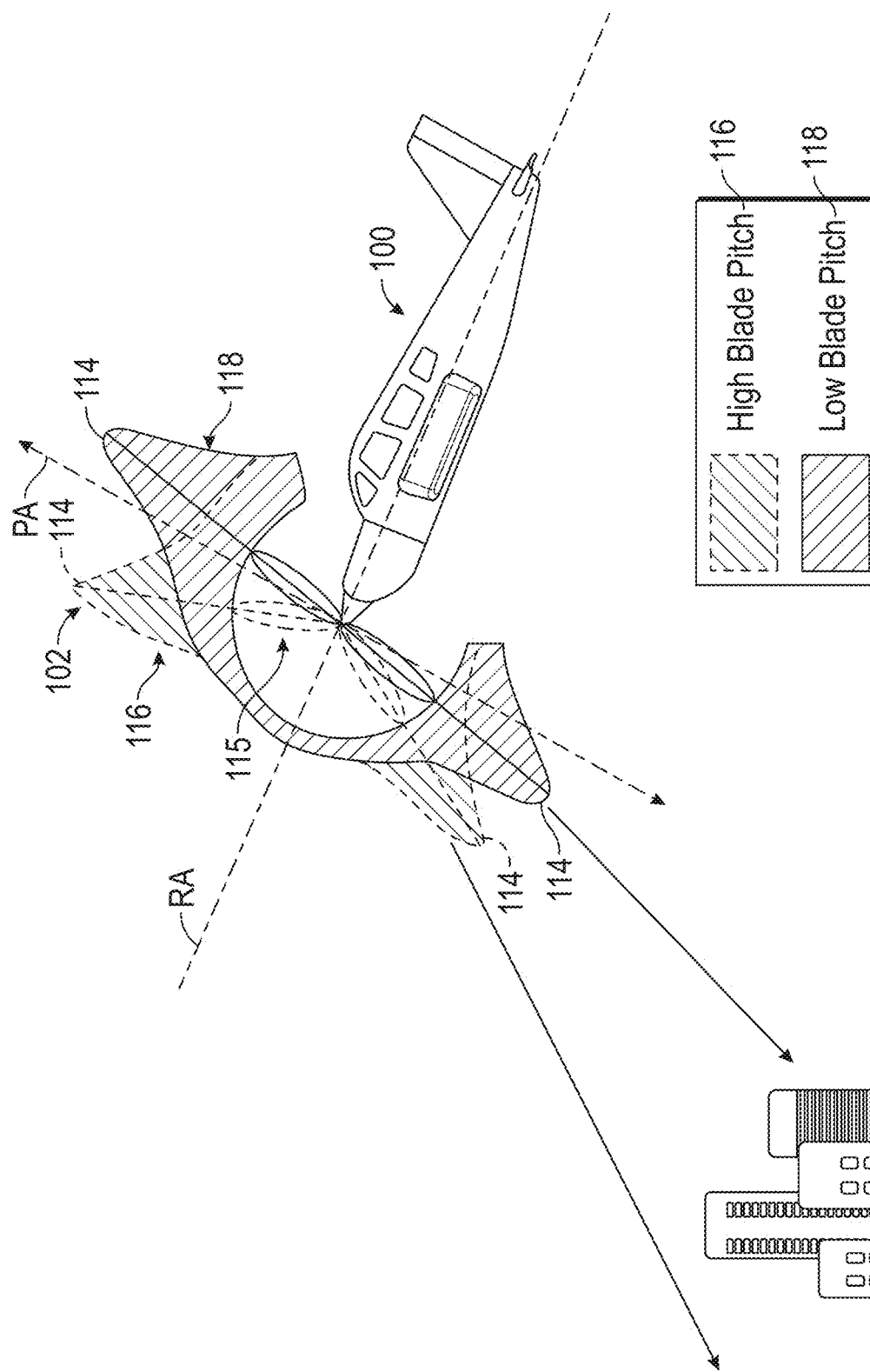
FIG. 2 shows a controllable pitch propeller of the aircraft of FIG. 1 in a high blade pitch position and a low blade pitch position.
Figure 5:
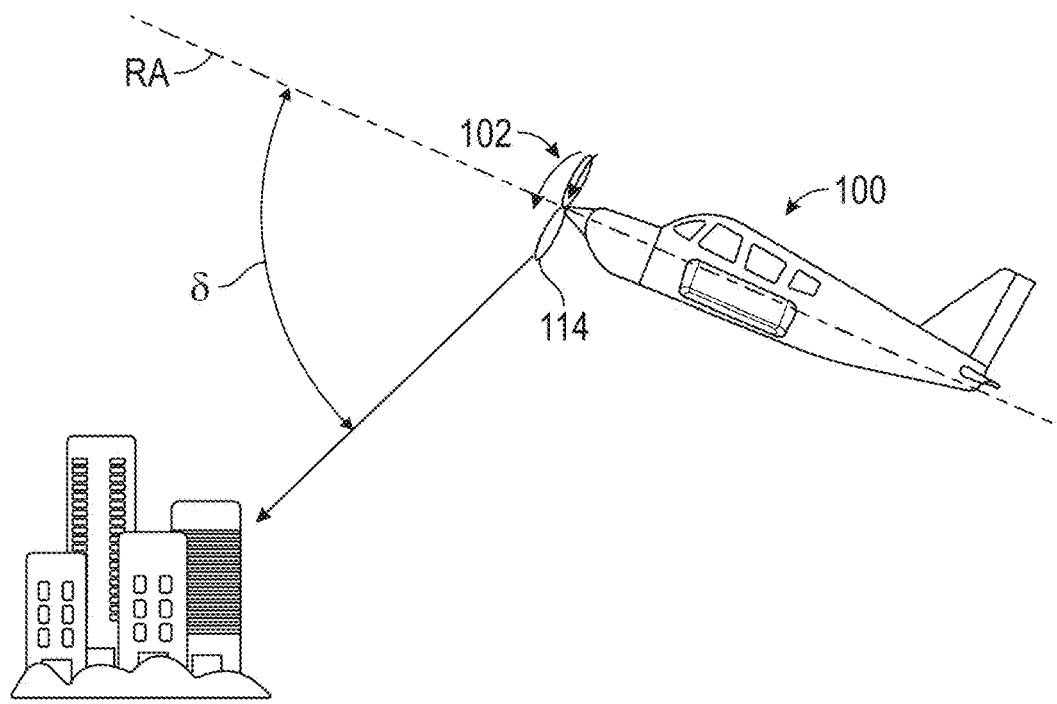
FIG. 5 shows a representation of an azimuth angle in relation to the aircraft of FIG. 1, during flight.

The propeller 102 generally will include a plurality of blades 114 arranged about a hub 115. Each of the blades 114 are rotatable about a rotational axis RA extending through the hub 115 and along the drive/propeller shaft 110 of the aircraft to provide thrust for the aircraft 100 (FIGS. 1-2, and 5). For example, FIGS. 1-2 show the propeller 102 including two blades 114. However, the propeller 102 also can be otherwise configured, e.g., with three or four blades, without departing from the scope of the present disclosure. In one embodiment, the propeller 102 can have a span, diameter, or overall length between the ends of the propeller blades of approximately 6 ft., though other spans, diameters, or lengths are possible without departing from the scope of the present disclosure, such as a diameter in a range from about 5 ft. to about 25 ft.

As generally shown in FIGS. 1 and 2, the propeller 102 will comprise a controllable pitch propeller, which can include a multi-blade propeller by an MT-Propeller Entwicklung of Atting, Del., and which will be operable to enable the blades 114 of the propeller to be pivoted, rotated, or otherwise moved about a pitch axis PA and in relation to the rotational axis RA to change or vary the blade pitch or angle of the blades 114. As, for example, shown in FIGS. 1 and 2, the pitch axis PA can be transverse or oblique to the rotational axis RA, as shown.

In addition, the aircraft 100 includes a controller 112 generally located within the cockpit or other suitable location of the aircraft, and in communication with and be operable to control the adjustment or variation of the controllable pitch propeller 102, enabling the pilot or co-pilot to change the pitch of the propeller blades by movement of the propeller blades between a plurality of positions, such as a high blade pitch position 116 and a low blade pitch position 118 (FIG. 2). In some embodiments, driver(s) or actuators controlling variation of the pitch of the blades of the propeller 102 can be powered by operation of the electric motor 106 of the aircraft, or by use of other suitable devices, such as an additional electric motor(s) or other suitable actuator(s), for example a hydraulic actuator. Accordingly, during operation of the aircraft in a gas engine mode, the controller 112 or a pilot also could change the angle or pitch of the propeller blades 114 in flight to alter torque and aircraft speed to help improve performance over a range of airspeeds in addition to helping provide reduction of propeller generated noise. The propeller 102 can similarly be operated in a hybrid or electric mode, however, without the torque and motor speed restriction.

The combination of an electric propulsive motor 106 and the controllable pitch propeller 102 further can provide an additional degree of freedom beyond classical internal combustion aircraft engines. For example, unlike classical engines, where the engine speed and torque curves generally are fixed, this combination can vary torque independent of motor speed, and can allow for the maintenance of substantially constant thrust for the aircraft while travelling at multiple engine speeds by varying blade pitch angle and therefore torque. The maintenance of substantially constant thrust further can be provided substantially without acceleration or performance changes to the aircraft, while using such a methodology to mitigate noise.

When the internal combustion engine 108 is operative, both the propeller and engine will generate noise. For example, at lower operating engine speeds, the engine dominates the noise output, while at higher operating speeds, the propeller will begin to dominate the perceived noise levels. In the hybrid and/or electric modes, or with the electric aircraft making use of an electric motor and without an internal combustion engine, generally, only have propeller noise considerations will be an issue, as the electric motor is virtually silent in comparison to the noise generated by the propeller for most operating speeds. To address such propeller noise, the pitch or position of the blades 114 of the propeller 102 can be altered to vary or mitigate the noise footprint on the ground and in flight as discussed below.

Figure 3:
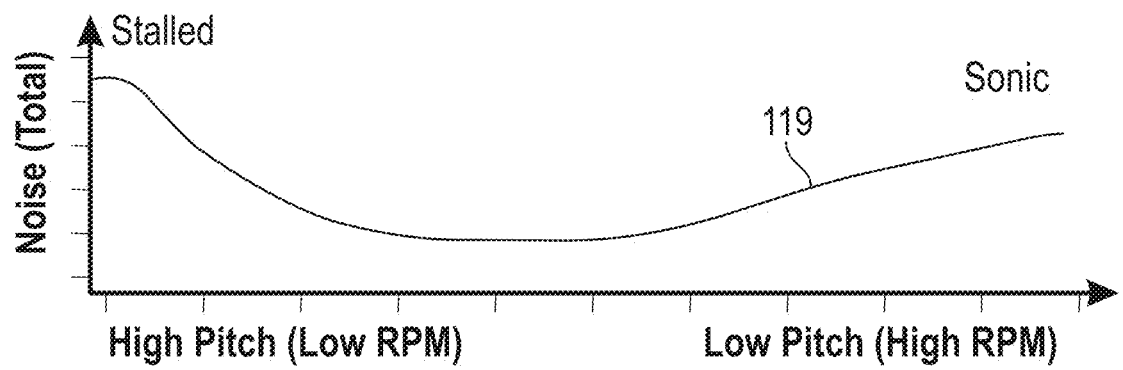
FIG. 3 shows an exemplary curve illustrating aircraft noise at constant thrust according to one aspect of the present disclosure.

FIG. 3 shows an exemplary curve 119 illustrating noise signature for an aircraft at a constant thrust. The noise coming from the propeller 102, as detected/experienced at some position spaced from the propeller 102 may be represented as a function of its speed, blade pitch (which produces a specific torque), true airspeed, and distance and position relative to the rotational axis of the propeller. The total magnitude of the noise generated by the propeller 102 at constant thrust could be generalized by high noise at high rotational speeds due to sonic tip speeds. High noise can also be generated by reducing rotational speed at constant thrust while yielding a blade pitch angle that produces separation (i.e., a stall condition). Between these two extremes is a noise minimum, as generally shown in FIG. 3.

Figure 4:
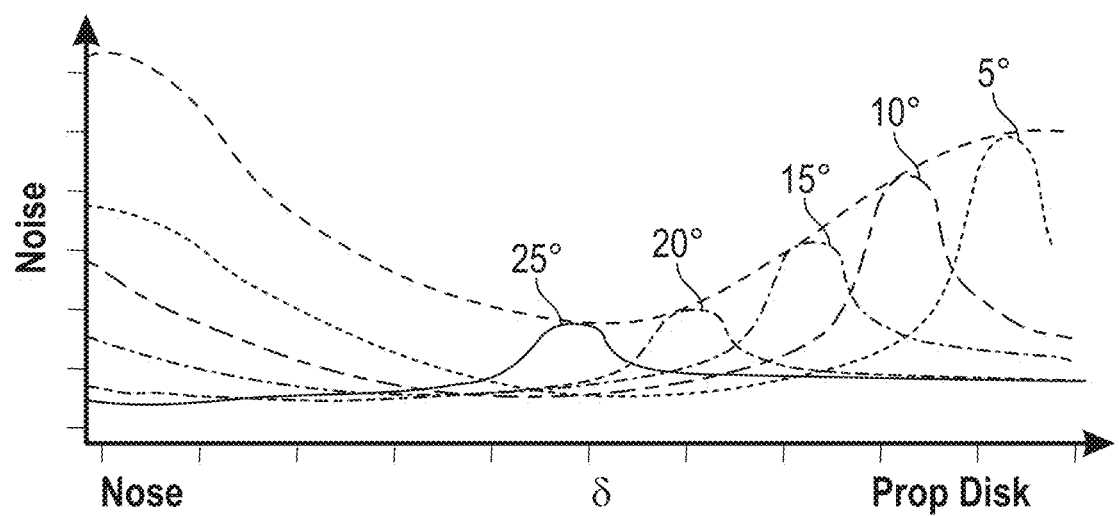
FIG. 4 shows a further exemplary curve illustrating the directional nature of the aircraft noise at constant thrust, as a function of the blade pitch angle, according to one aspect of the present disclosure.

Accordingly, noise can be represented as a function of rotational speed and blade angle. The noise, however, generally does not radiate out equally as a point source. FIG. 4 further shows that the noise from the propeller is directional, and as a result, there are directions that experience a greater magnitude of noise than others. The direction of maximum noise may be represented as a function of true airspeed, rotational speed, and blade angle.

As generally shown in FIG. 5, it is also possible to define an azimuth angle, δ from the rotational axis RA of the propeller or from the nose, zero degrees, and proceeding to approximately 90 degrees, the propeller disk place. The azimuth angle, however, can be in a range from approximately 0 degrees to approximately 180 degrees, and further can be defined opposite the direction of the nose, e.g., behind the aircraft, or to have any other suitable arrangement/configuration, without departing from the scope of the present disclosure.

With the combination of a controllable pitch propeller 102 and an electric propulsive motor 106 according to the present disclosure, substantially constant thrust can be maintained by the controlling blade pitch to move the point of maximum noise to develop a graphical representation of the noise magnitudes generated by the propeller at varying pitches.

Figure 6:
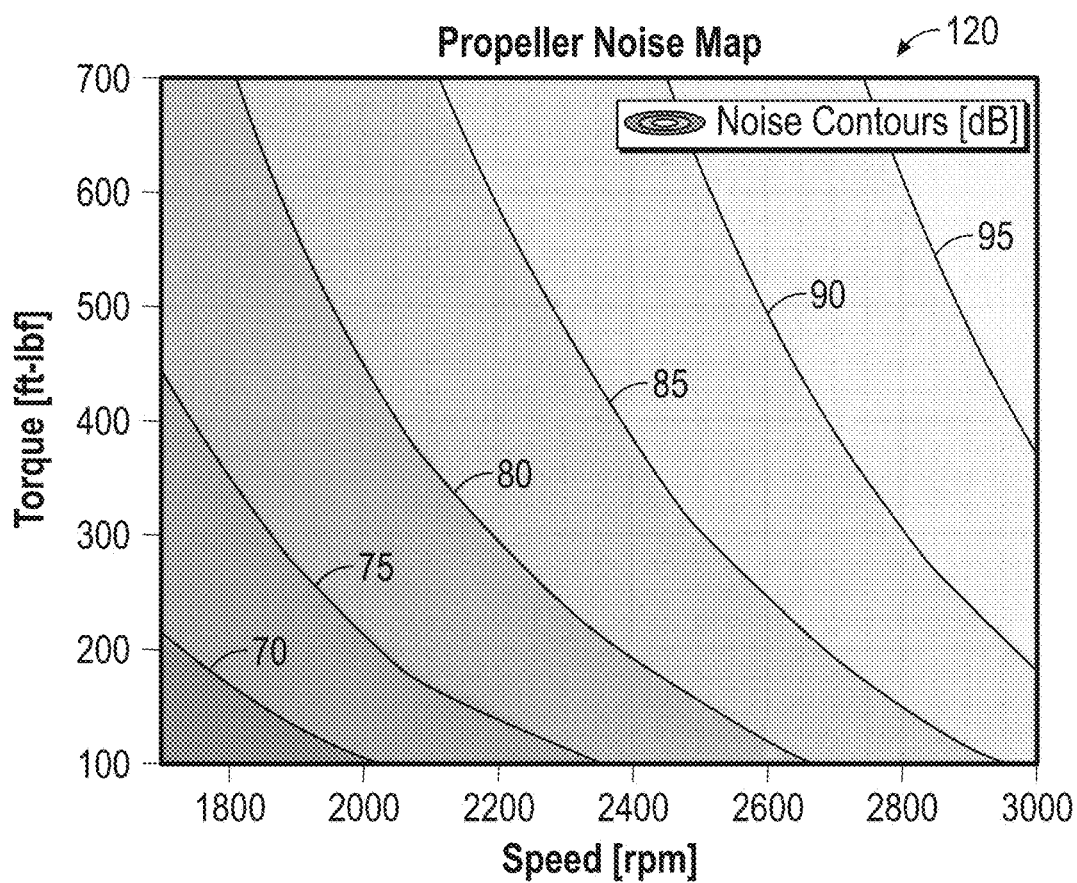
FIG. 6 shows an exemplary propeller noise map according to one aspect of the present disclosure.
Figure 7:
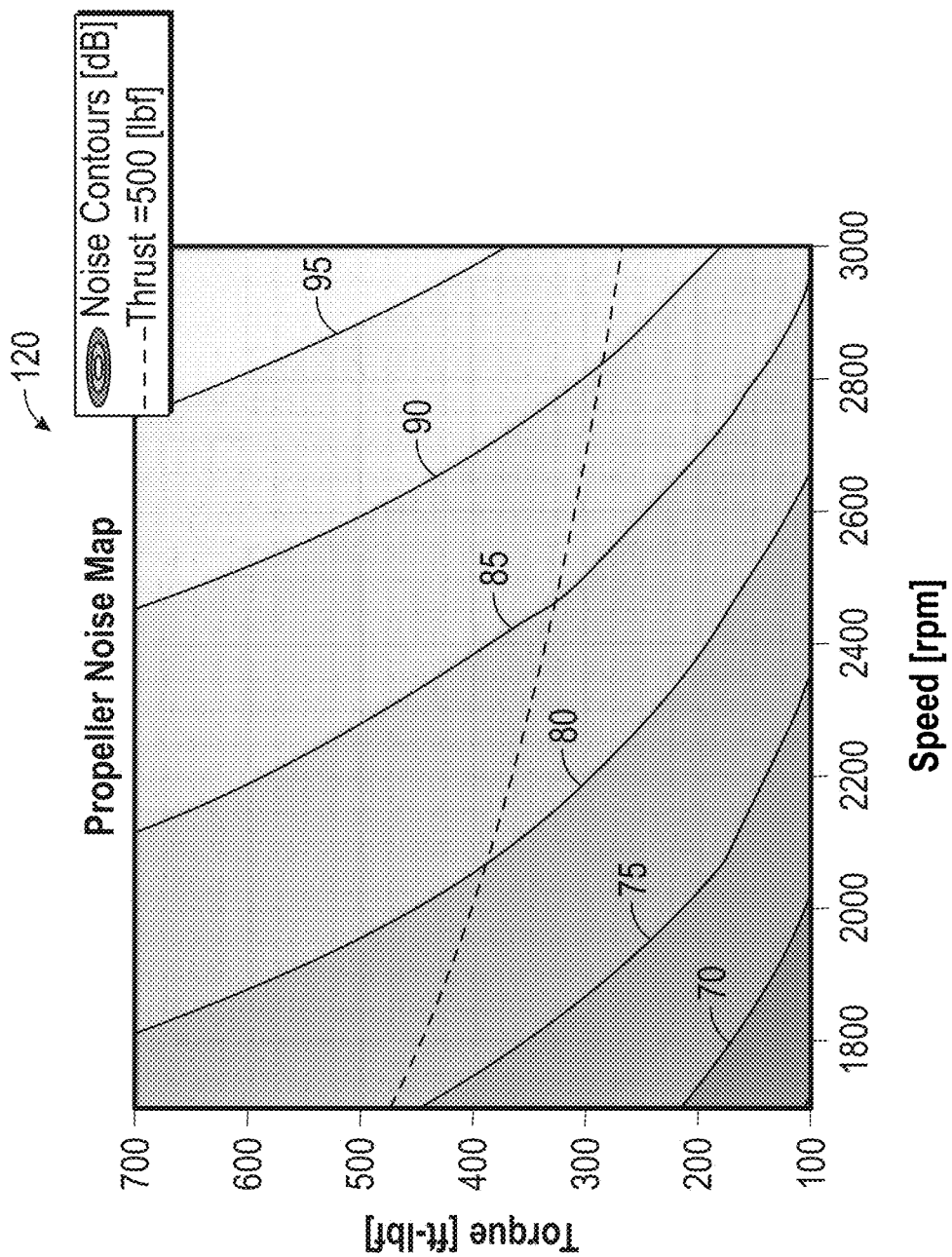
FIG. 7 shows the exemplary noise map of FIG. 6, with a constant thrust curve.
Figure 8:
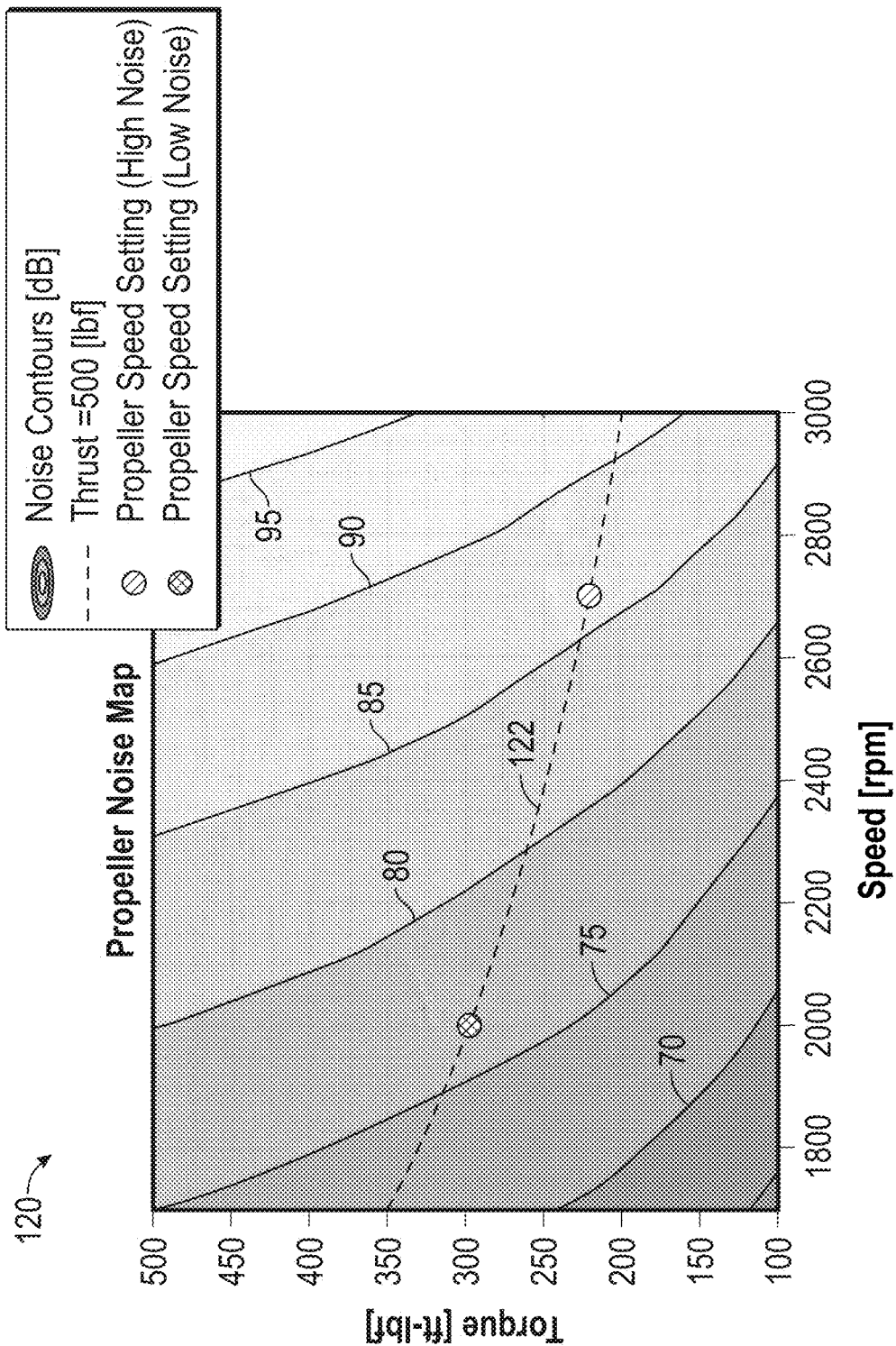
FIG. 8 shows the exemplary noise map of FIG. 6, with a constant thrust curve and high and low propeller speed settings.

As generally shown in FIGS. 6-8, a noise map 120 and arbitrary constant thrust curve 122 further can be generated in terms of propeller torque and rotational speed. Such maps can also show high and low noise propeller speed settings (FIG. 8). For example, using defined inputs, e.g., inputs as shown in Table 1 below, the noise map can be generated, which map also can be displayed in a similar common format with electric motor efficiency. In one example, the Hamilton Standard can be used for empirical noise computation. Table 1 provides exemplary inputs to generate an exemplary noise map.

TABLE 1

| Input | Value | Units |
|---|---|---|
| Propeller Diameter | 6 | ft |
| Number of Blades | 2 | — |
| Number of Propellers | 1 | — |
| Power Input per Propeller | * * * * * | Hp |
| Flight Speed | 100 | KTAS |
| Ambient Temperature | 59 | ° F. |
| Azimuth Angle | 105 | deg |
| Distance at which noise is to be defined | 1000 | Ft |

The value of the power input per propeller may be arbitrary and/or can be varied due to the nature of a torque versus rotational speed map.

The noise map 120 may be generated for all power settings within a defined envelope where a defined noise level can be computed, and each power setting may correspond to a single thrust value, allowing an arbitrary thrust value to be chosen for this calculation. For example, 500 lbf of thrust can be used as shown in FIGS. 7 and 8.

With a defined noise map, and with a selected or known cruising thrust force, varying propeller blade angles (or the rotor/prop-rotor blade angles) can be determined for minimizing noise at differing locations, altitudes and speeds during flight of the aircraft. These noise maps 120 can be generated by the aircraft's controller 112 and the aircraft's controller 112 can display the noise maps 120 on one or more displays 121 arranged within the aircraft's cockpit. The present disclosure is not so limited, however, and the noise map(s) may be generated off-board using a computer or other suitable device, such as at a flight control center, and can be communicated to the aircraft before or during flight.

Accordingly, based on these generated noise maps 120, the aircraft controller 112 can maintain constant thrust at multiple engine or motor speeds and can control the pitch of the propeller by varying propeller blade 102 angles (or the rotor/prop-rotor blade angles) and consequently produced torque, to allow the aircraft controller 112 to maintain a substantially constant airspeed with the ability to vary the propeller noise footprint. Additionally, or in the alternative, the pilot or other operator of the aircraft can control/alter the propeller blade 114 angle/pitch, thrust, and/or torque based on the generated noise map 120 to minimize noise over selected areas.

In one example, a map of noise pertinent variables such as propeller rotational speed, blade pitch, angle of attack, and true airspeed also can be generated for each aircraft propulsion system in use thereof. A map of noise sensitive areas also can be generated on the surface of the Earth in terms of latitude, longitude, and a noise sensitivity index. These also can be generated by the controller and displayed on the display, or alternatively, by an off-board computer pre-flight or during flight, such as at the flight control center.

Propeller noise may not radiate out equally as a point source, and some directions may be noisier than others. With a map of noise directionality and a map of noise sensitive areas in a North-East-Down (NED or NEU) system, ground noise may be predicted by mapping this through the attitude (Euler angles) and the position of the aircraft 100, such as from a position or locating device, e.g., a IMU or GPS in communication with the aircraft controller.

Using the anticipated flight path of the aircraft, the noise may be mitigated through noise sensitive areas by changing the blade pitch at constant thrust throughout the flight, e.g., by the pilot or automatically by the controller. For example, an optimization algorithm could be used knowing, for example, the noise map, geographical map, and a state vector of the aircraft. The maximum noise position of the aircraft may be moved rapidly or jumped across noise sensitive areas and left to linger in non-sensitive areas.

The example embodiment of an electric motor 106 and controllable pitch electric propeller 102 can thereby minimize noise in noise sensitive areas, while substantially avoiding potentially compromising performance of the aircraft or providing substantial discomfort to the passengers and crew.

Figure 9:
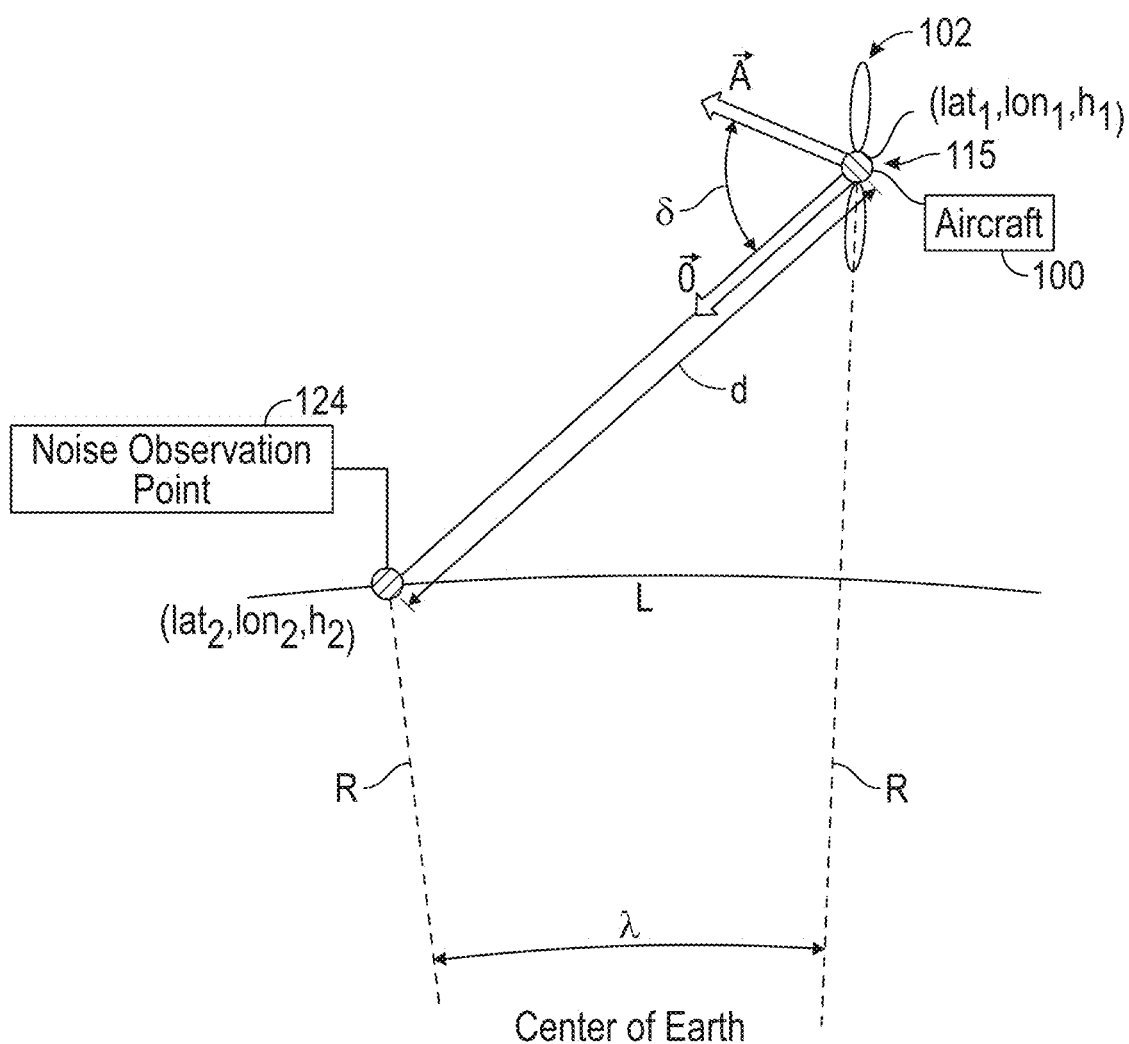
FIG. 9 shows an exemplary representation of noise observation distance and azimuth of an aircraft according to one aspect of the present disclosure.

As further generally shown in FIG. 9, perceived noise can be represented as a function of the distance from the propeller 102 and azimuth angle δ, relative to the propeller axis in the forward direction. It may be desirable to be able to define the distance and azimuth based on the aircraft's position and attitude with respect to an observer or measurement device on the ground, e.g., noise observation or reference point 124. Position can be defined in terms of latitude, longitude, and altitude, while the attitude is the pitch angle, θ, bank angle, φ and heading, ψ. The bank angle φ can be assumed to rotate about a longitudinal axis of the aircraft or the rotational axis RA, which may be parallel to the longitudinal axis.

The distance or arc length, L, between a pair of latitudes and longitudes can be computed, for example, using the Haversine formula as shown below:

$$a = \sin^2\left(\frac{lat_2 - lat_1}{2}\right) + \cos(lat_1)\cos(lat_2)\sin^2\left(\frac{lon_2 - lon_1}{2}\right) \quad (1)$$

$$b = \operatorname{atan2}(\sqrt{a}, \sqrt{1-a}) \quad (2)$$

$$L = 2R * b \quad (3)$$

The distance defined does not yet account for altitude difference between the aircraft and observer position, and can be computed as follows where R is the radius of the Earth, and A is the central angle of the Earth:

$$\lambda = \frac{L}{R}\frac{360}{2\pi} \quad (4)$$

$$d = \sqrt{(R+h_1)^2 + (R+h_2)^2 - 2(R+h_1)(R+h_2)\cos(\lambda)} \quad (5)$$

The azimuth angle δ can then be computed to complete the function. Using the aircraft position as the origin, two 3D vectors can be generated and/or graphically represented, one pointing towards the observer, and the other in the airplane's direction of travel. The angle between these vectors is the azimuth angle and is computed as follows:

$$\delta = \arccos\left(\frac{\vec{O}\cdot\vec{A}}{\|\vec{O}\|\|\vec{A}\|}\right) \quad (6)$$

Where:

$$\vec{O} = \langle dlat, dlon, dh\rangle \quad (7)$$

$$\vec{A} = \langle \cos(\theta)\cos(\psi), \cos(\theta)\sin(\psi), \sin(\theta)\rangle \quad (8)$$

The latitude and longitude terms within $\vec{O}$ can be computed, for example, using the Haversine formula, without any altitude correction, since the goal is to define component vectors in NED. The first term in each vector represents the 'North' component, the second term 'East', and the third term 'Down'. To compute dlat, a constant longitude can be applied to the Haversine formula to determine the distance between the two latitude lines. To compute dlon, constant latitude can be applied to the Haversine formula to determine the distance between the two longitude lines. Finally, to compute dh, the two altitudes that are used for the aircraft and observer may be subtracted. If the aircraft is north or east of the observer, a negative correction factor is required to compute the correct azimuth angle. If the aircraft is north of the observer, dlat=−dlat, and if the aircraft is east of the observer, dlon=−dlon. This correction only applies if the variable assignment shown in FIG. 9 is used where position A is the aircraft and position B is the observer.

A noise sensitivity index further can be rated on a scale of 1 to 10, where 1 is defined as the least sensitive and 10 is the most sensitive to noise. This index comes into play when defining noise sensitive areas over a specified geographic region of the Earth. For example, the ocean would likely have a noise sensitivity index of 1, while a major city would likely have a sensitivity index of 10.

Figure 10A:
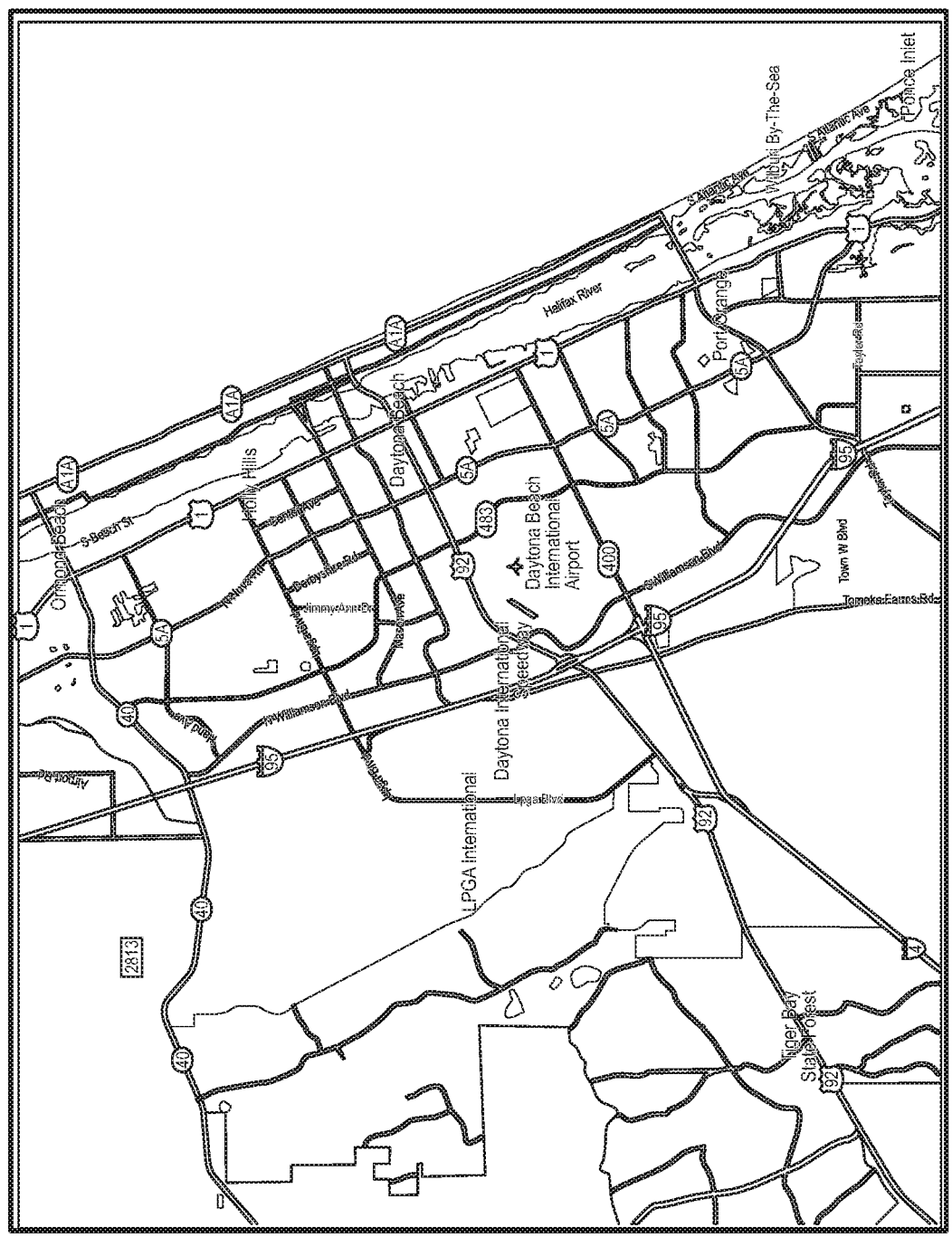
FIG. 10A shows a representative geographical map according to one aspect of the present disclosure.
Figure 10B:
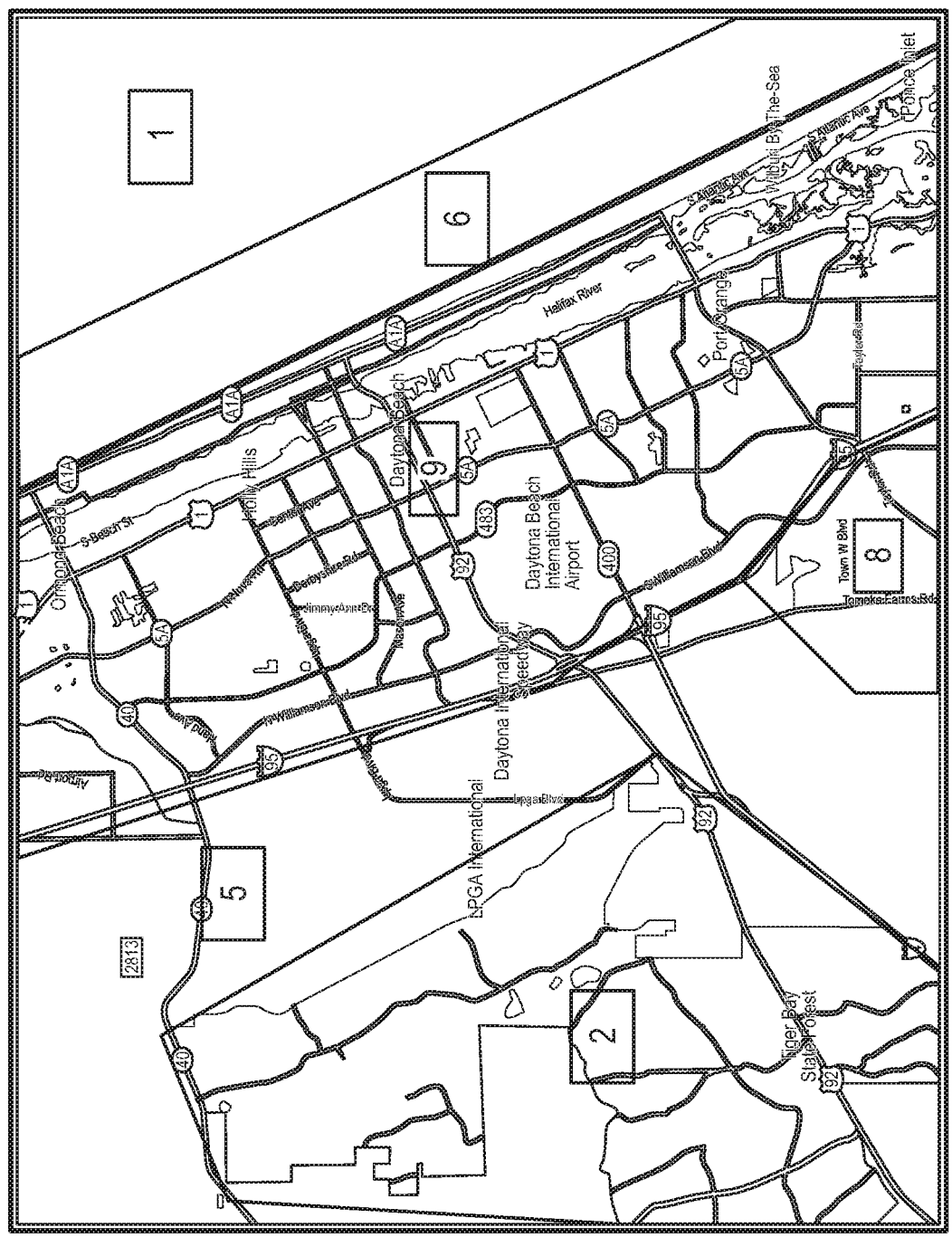
FIG. 10B shows noise sensitivity regions and applicable indices applied to the geographic map of FIG. 10A.

A sample noise map combined with or overlaid on a geographical map can be generated and superimposed over a selected region. For example, FIGS. 10A and 10B show a map of the Daytona Beach, Fla. region, with noise sensitivity areas generated and imposed on the surface of the Earth, e.g., as shown in FIG. 10A. Noise sensitivity regions and applicable indices also can be provided as shown on the map of FIG. 10B. Such combined sample noise geographical maps can be generated by the controller 112 and displayed on the display in the cockpit, though such map can also be generated off-board the aircraft, such as at a flight control center, without departing from the present disclosure.

With determined or known sensitivity zones and corresponding indices, the controller 112 can automatically alter to minimize or produce minimal noise over specific regions, e.g., a region with an index of 9, and generally can employ any blade pitch or angle while over the region with an index of 1. Additionally, or in the alternative, a pilot or other operator of the aircraft could manually alter the blade pitch or angle based on the region over which the aircraft 100 is traveling, the sensitivity zones, and/or corresponding indices. This allows for reduction in noise over the primary populated area and includes transition zones so the aircraft can have reduced noise when approaching the high sensitivity zones.

Figure 11:
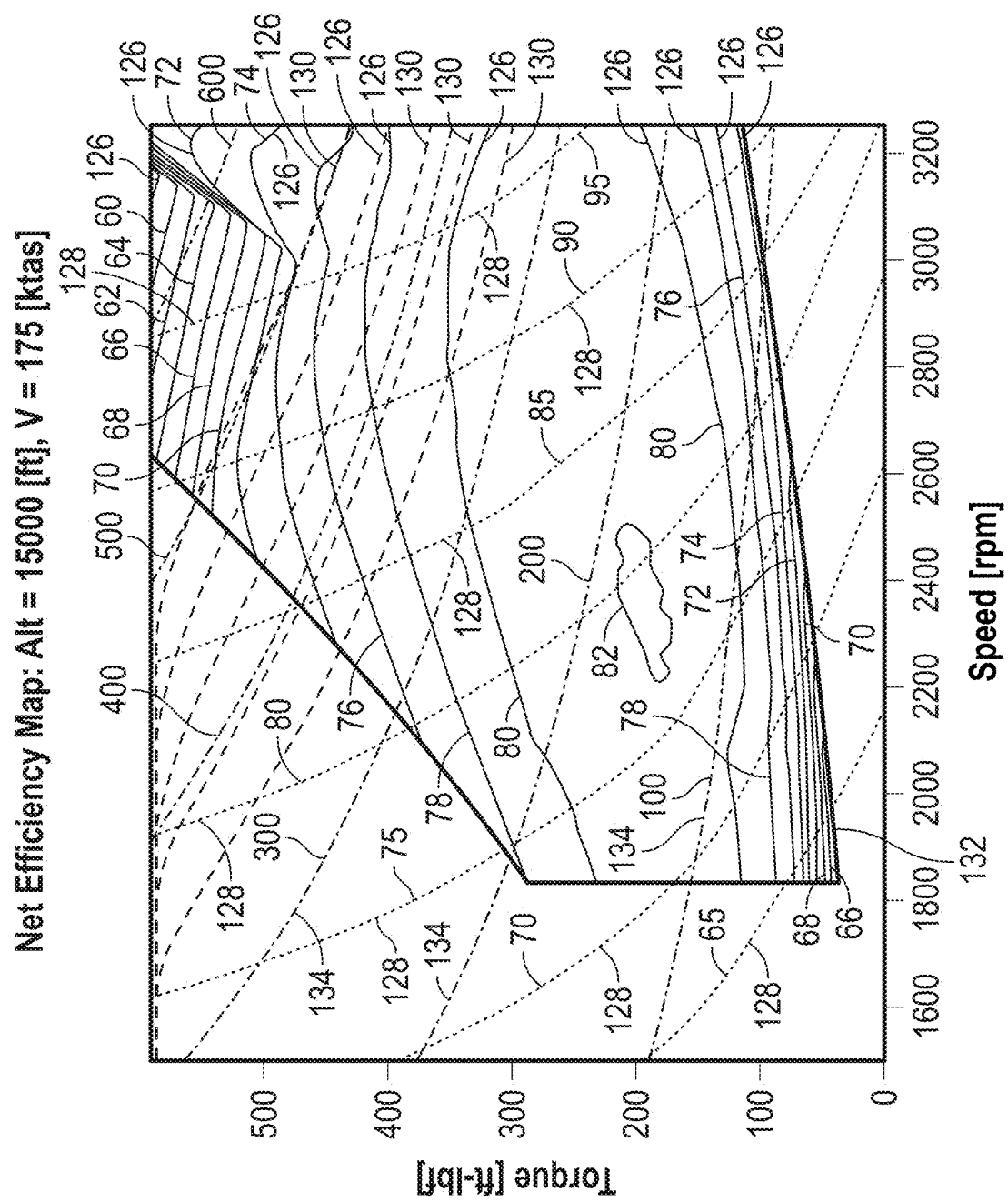
FIG. 11 shows a net efficiency propulsive map for an electric motor with a controllable pitch electric propeller according to one aspect of the present disclosure.

FIG. 11 shows a propulsive map developed for a YASA 750 electric motor with a controllable pitch electric propeller, such as an MT-Propeller. In FIG. 11, contour lines 126 are lines of constant propulsive efficiency in percent. Dotted lines 128 are lines of constant, Hamilton-Standard, far field noise in dBA. The dashed lines 130 are lines of minimum voltage on the electric motor and represent the envelope. The solid line 132 is the envelope for high fidelity propeller data. The dot-dash lines 134 are lines of constant thrust. This is data for the HK-36 "Spirit of St. Louis" configuration as it exists right now in EFRC. In a hybrid-electric application, any area can be chosen/selected on lines 134 to facilitate active optimization of far field noise emissions, propulsive efficiency or a combination of both. This can be done at constant airspeed. This is an algorithm for active ground (far field) noise mitigation.

In addition, a method for mitigating noise footprints of hybrid and/or electric aircraft can be provided, which method can include providing a propulsion system with electric motor and an electric controllable pitch propeller. This method further can include changing the propeller blade angle independently from the engine, therefore altering the peak noise direction while maintaining constant thrust and airspeed. The method further can include mapping a distance and azimuth angle between the propeller and an observer by mapping an attitude and/or position of the aircraft, and applying these results to a noise map with noise sensitive areas marked by an index of the relative sensitivity of this specific area, to facilitate reducing noise over the highly sensitive areas, without altering the flight path or airspeed of the aircraft.

Example

The following example demonstrates low or high noise during a climb-out from Daytona Beach International Airport using data for a Cessna 172S (200 in FIG. 12) at approximately 500 feet above ground level. While a Cessna 172S does not have an electric motor or a controllable pitch propeller, this example assumes that this is the case, while maintaining propeller geometry and performance characteristics. It is also assumed that the gearing between the motor and propeller is 1:1.

Figure 12:
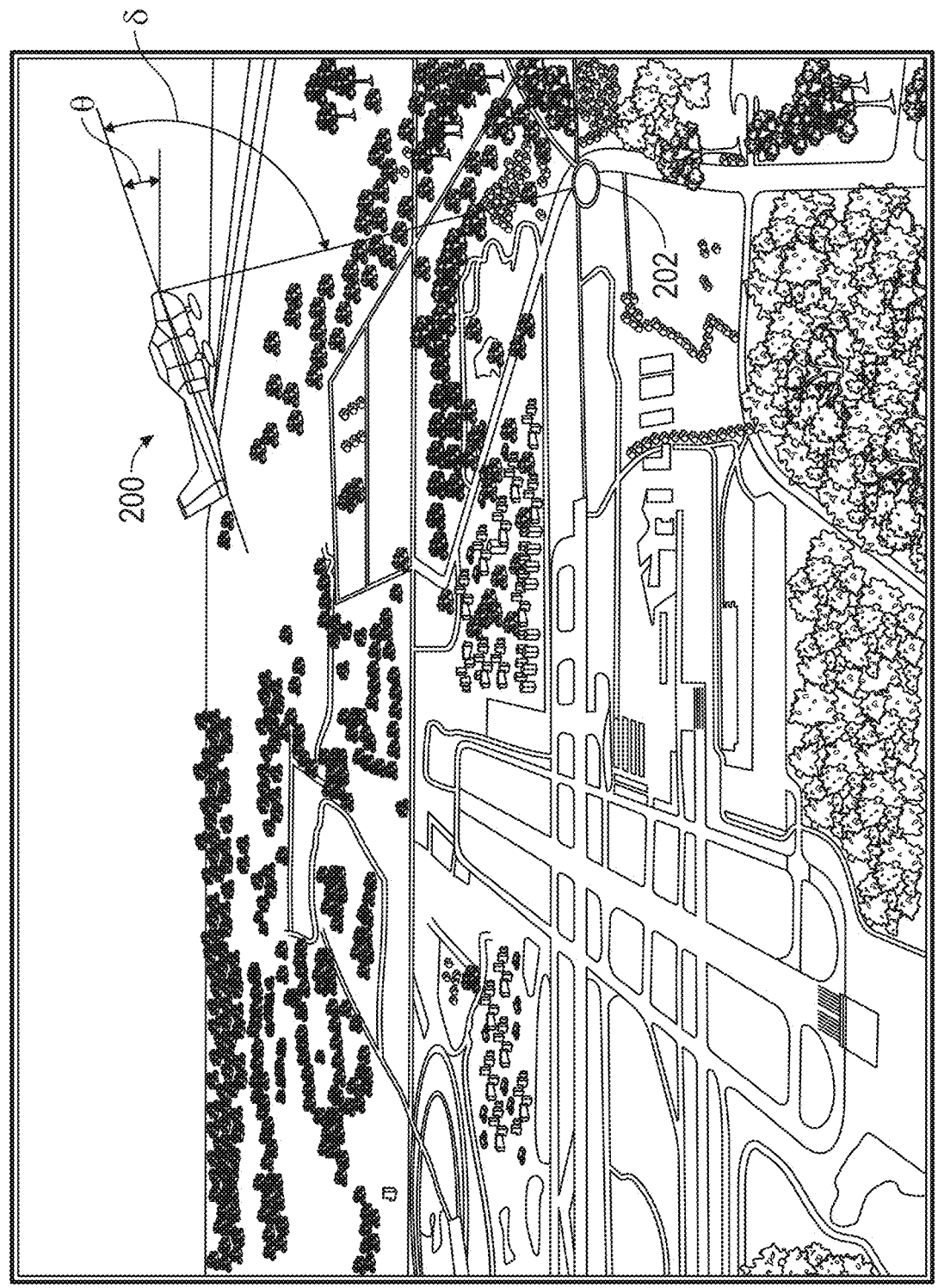
FIG. 12 shows an example aircraft and an on ground marker for use in the system and method of the present disclosure.

FIG. 12 shows the ground layout area of the east side of Daytona Beach International Airport.

TABLE 2

| Input | | Value | Units |
|---|---|---|---|
| Propeller Diameter | | 6.33 | Ft |
| Number of Blades | | 2 | — |
| Number of Propellers | | 1 | — |
| Power Input per Propeller | | 180 | Hp |
| Flight Speed | | 74 | KTAS |
| Ambient Temperature | | 59 | ° F. |
| Aircraft | Latitude | 29.185803 | Deg |
| | Longitude | −81.045096 | |
| | Pitch Angle | 10 | |
| | Bank Angle | 0 | |
| | Heading | 70 | |
| | Altitude | 500 | Ft |

TABLE 2-continued

| Input | | Value | Units |
|---|---|---|---|
| Observer | Latitude | 29.186702 | Deg |
| | Longitude | −81.042904 | |
| | Altitude | 32 | Ft |

FIG. 12 shows a marker 202 located on the ground as a reference point for the observer (where the noise is measured). The latitude, longitude, and altitude above mean sea level are obtained using Google Earth.

The process described above was used to determine the distance between the aircraft and the observer as well as the azimuth angle Earth's radius, R, is assumed to be 20902232 ft:

$$a = \sin^2\left(\frac{8.99e^{-4}}{2}\right) + \cos(29.185803)\cos(29.186702)\sin^2\left(\frac{0.0022}{2}\right) \quad (9)$$
$$= 2.789e^{-10}$$

$$b = \operatorname{atan2}(\sqrt{2.789e^{-10}}, \sqrt{1 - 2.789e^{-10}}), \quad (10)$$
$$= 1.67e^{-5}$$

$$L = 2(209022312) * 1.67e^{-5} \quad (11)$$
$$= 771.34 \text{ ft}$$

$$\lambda = \frac{771.34}{20902232}\frac{360}{2\pi} \quad (12)$$
$$= 0.0021 \text{ deg}$$

$$d^2 = (20902232 + 500)^2 + (20902232 + 32)^2 - \quad (13)$$
$$2(20902232 + 500)(20902232 + 32(\cos(0.0021))$$
$$= 8.14e^5$$

$$d = \sqrt{8.14e^5}$$
$$= 902.22 \text{ ft}$$

Azimuth angle can now be computed:

$$\vec{O} = \langle dlat, dlon, dh \rangle \quad (14)$$
$$= \langle 327.97, 698.15, -468 \rangle$$

$$\vec{A} = \langle \cos(10)\cos(70), \cos(10)\sin(70), \sin(10) \rangle \quad (15)$$
$$= \langle 0.3368, 0.9254, 0.1736 \rangle$$

$$\delta = \arccos\left(\frac{\langle 327.97, 698.15, -468 \rangle \cdot \langle 0.3368, 0.9254, 0.1736 \rangle}{(902.22)(1)}\right) \quad (16)$$
$$= 41.54 \text{ deg}$$

A noise map can now be generated for this flight condition.

Table 3 summarizes the results of this plot. 500 lbf of thrust was selected arbitrarily and does not necessarily represent the actual value of thrust produced in the given flight condition.

TABLE 3

| Parameter | High Noise | Low Noise | Units |
|---|---|---|---|
| Propeller Rotational Speed | 2700 | 2000 | Rpm |
| Propeller Torque | 220 | 300 | ft-lbf |
| Propeller Noise | 86.1 | 76.4 | dB |
| Thrust | 500 | 500 | lbf |

The measurement can be either 86.1 dB or 76.4 dB depending on the propeller setting. Both of these are achievable at a single point with constant thrust and airspeed due to the assumed electric motor and controllable pitch propeller combination. If the noise sensitivity index is high, like that of FIG. 10B, the lower noise value would be desired.

The foregoing description generally illustrates and describes various embodiments of the present invention. It will, however, be understood by those skilled in the art that various changes and modifications can be made to the above-discussed construction of the present invention without departing from the spirit and scope of the invention as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present invention. Accordingly, various features and characteristics of the present invention as discussed herein may be selectively interchanged and applied to other illustrated and non-illustrated embodiments of the invention, and numerous variations, modifications, and additions further can be made thereto without departing from the spirit and scope of the present invention as set forth in the appended claims.

What is claimed is:

1. An aircraft, comprising:
a controllable pitch propeller or rotor comprising a plurality of blades moveable about at least one pitch axis to vary blade pitch thereof;
a drive system having an electric motor coupled to a drive shaft and operable to drive rotation of the plurality of propeller blades around the axis of the drive shaft to provide thrust for propulsion of the aircraft; and
a controller in communication with the drive system and operable to alter at least one aspect of the controllable pitch propeller or rotor generated noise by substantially simultaneously varying the blade pitch of the plurality of blades and a torque of the electric motor to maintain a substantially constant thrust, a substantially constant altitude, and/or a substantially constant airspeed of the aircraft, while a rotational speed of the controllable pitch propeller or rotor varies between a higher RPM and a lower RPM.

2. The aircraft of claim 1, wherein the blades are rotatable between a plurality of positions, including a high blade pitch position and a low blade pitch position.

3. The aircraft of claim 1, further comprising one or more displays, and wherein the controller is operable to generate at least one noise map, and display the at least one noise map on the one or more displays of the aircraft.

4. The aircraft of claim 3, wherein the at least one noise map comprises a geographic map identifying noise sensitive areas or zones, and wherein noise of the aircraft is mitigated the controller by changing the blade pitch at a constant thrust of the aircraft throughout flight of the aircraft as the aircraft passes through or near the noise sensitive areas or zones.

5. The aircraft of claim 4, wherein the noise sensitive areas or zones are defined using a noise sensitivity index.

6. The aircraft of claim 1, further comprising a power source in communication with the electric motor to provide electric power thereto.

7. The aircraft of claim 1, further comprising an actuator in communication with the propeller or rotor for altering the pitch of the plurality of blades of the controllable pitch propeller or rotor substantially independently of the operation of the electric motor.

8. The aircraft of claim 1, wherein the controllable pitch propeller or rotor is configured to operate in a low-noise mode involving high blade pitch and low RPM, and in a high-efficiency mode involving low blade pitch and high RPM, wherein the torque applied by the electric motor is varied such that the thrust delivered by the controllable pitch propeller or rotor is substantially equivalent in each mode.

9. An aircraft, comprising:
a variable pitch propeller or rotor comprising a plurality of blades arranged about a rotational axis, and moveable about a pitch axis to vary blade pitch thereof in relation to the rotational axis;
a drive system having an electric motor and a drive shaft connected to the variable pitch propeller or rotor for driving rotation of the plurality of propeller blades about the rotational axis to provide thrust for propulsion of the aircraft; and
a controller in communication with the drive system and operable for selectively varying the blade pitch of the blades of the variable pitch propeller or rotor to alter and/or focus at least one aspect of propeller or rotor generated noise of the aircraft, while controlling torque and RPM of the electric motor for balancing the pitch of the blades with the torque and RPM of the electric motor sufficient to maintain a substantially constant thrust, a substantially constant altitude, and/or a substantially constant airspeed of the aircraft.

10. The aircraft of claim 9, further comprising an actuator in communication with the variable pitch propeller or rotor, wherein the actuator is engaged by the controller or a pilot for altering the pitch of the plurality of blades of the variable pitch propeller or rotor substantially independently of the operation of the electric motor.

11. The aircraft of claim 9, wherein the blades are rotatable between a plurality of positions, including a high blade pitch position and a low blade pitch position.

12. The aircraft of claim 9, further comprising one or more displays, and wherein the controller is operable to generate at least one noise map, and display the at least one noise map on the one or more displays of the aircraft.

13. The aircraft of claim 12, wherein the at least one noise map comprises a geographic map identifying noise sensitive areas or zones, and wherein noise of the aircraft is mitigated the controller by changing the blade pitch at a constant thrust of the aircraft throughout flight of the aircraft as the aircraft passes through or near the noise sensitive areas or zones.

14. The aircraft of claim 9, further comprising a power source in communication with the electric motor to provide electric power thereto.

15. The aircraft of claim 9, wherein the variable pitch propeller or rotor is configured to operate in a low-noise mode involving high blade pitch and low RPM, and in a high-efficiency mode involving low blade pitch and high RPM, wherein the torque applied by the electric motor is varied such that the thrust delivered by the propeller or rotor is substantially equivalent in each mode.

* * * * *